(12) United States Patent
McGaughy et al.

(10) Patent No.: US 10,339,240 B2
(45) Date of Patent: Jul. 2, 2019

(54) ADAPTIVE HIGH SIGMA YIELD PREDICTION

(71) Applicant: ProPlus Design Solutions, Inc., San Jose, CA (US)

(72) Inventors: Bruce W. McGaughy, Pleasanton, CA (US); Yutao Ma, San Jose, CA (US)

(*) Notice: Subject to any disclaimer, the term of this patent is extended or adjusted under 35 U.S.C. 154(b) by 434 days.

(21) Appl. No.: 14/967,184

(22) Filed: Dec. 11, 2015

(65) Prior Publication Data

US 2017/0169147 A1 Jun. 15, 2017

(51) Int. Cl.
*G06F 11/00* (2006.01)
*G06F 17/50* (2006.01)

(52) U.S. Cl.
CPC ...... *G06F 17/5036* (2013.01); *G06F 17/5081* (2013.01); *G06F 2217/10* (2013.01)

(58) Field of Classification Search
CPC .............................. G06F 17/5036; G06F 17/18
See application file for complete search history.

(56) References Cited

U.S. PATENT DOCUMENTS

| | | | | |
|---|---|---|---|---|
| 2007/0294648 A1* | 12/2007 | Allen | ................ | G06F 17/5068 716/52 |
| 2010/0313070 A1* | 12/2010 | Joshi | .................... | G06F 11/008 714/26 |
| 2011/0153271 A1* | 6/2011 | Tiwary | ................ | G06K 9/6226 702/181 |
| 2011/0313747 A1* | 12/2011 | Joshi | .................... | G06F 17/5018 703/14 |
| 2013/0212444 A1* | 8/2013 | Joshi | ..................... | G11C 29/08 714/718 |
| 2015/0081599 A1* | 3/2015 | Dobler | ................ | G01R 31/088 706/12 |

* cited by examiner

*Primary Examiner* — Brian W Wathen
*Assistant Examiner* — Abdou K Seye (57) ABSTRACT

Methods and systems are disclosed for determining a yield of a circuit in semiconductor manufacturing. In one embodiment, a computer implemented method includes performing a first pass of Monte Carlo simulations of the circuit to identify a plurality of failed sampling points in a high sigma region of a statistical distribution, partitioning the plurality of failed sampling points into a plurality of clusters based on angular separation of the plurality of failed sampling points, determining a boundary of each cluster in the plurality of clusters, performing sensitivity analysis from the boundary of the each cluster to identify an estimated closest failed sampling point associated with the each cluster, and performing a second pass of Monte Carlo simulations of the circuit to determine the yield of the circuit using the estimated closest failed sampling point associated with the each cluster and the boundary of each cluster in the plurality of clusters.

21 Claims, 9 Drawing Sheets

302 — Perform the first pass of Monte Carlo simulation with respect to a uniform distribution; where the uniform distribution increases a probability of identifying a failed sampling point in the high sigma region of the statistical distribution 304 — Perform the first pass of Monte Carlo simulation with respect to a normal distribution with scaled sigma; where the normal distribution with scaled sigma increases a probability of identifying a failed sampling point in the high sigma region of the statistical distribution

ADAPTIVE HIGH SIGMA YIELD PREDICTION

FIELD OF THE INVENTION

The present invention relates to the field of electronic design automation tools. In particular, the present invention relates to methods and apparatuses for determining a yield of a circuit in semiconductor manufacturing.

BACKGROUND OF THE INVENTION

An integrated circuit is a network of circuit elements such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

The development of complicated integrated circuits often requires the use of powerful numerical simulation programs. For example, circuit simulation is an essential part in the design flow of integrated circuits, helping circuit designers to verify the functionality and performance of their designs without going through expensive fabrication processes. As the semiconductor processing technology migrates to nanometer dimensions, new simulation methodologies are needed to solve the new problems intrinsically existing in circuit design with nanometer features. Modern integrated circuits continually challenge circuit simulation algorithms and implementations in the development of new technology generations. The semiconductor industry requires EDA software with the ability to analyze nanometer effects like coupling noise, ground bounce, transmission line wave propagation, dynamic leakage current, supply voltage drop, and nonlinear device and circuit behavior, which are all related to dynamic current. Thus, detailed circuit simulation and transistor-level simulation have become one of the most effective ways to investigate and resolve issues with nanometer designs.

Examples of electronic circuit simulators include the Simulation Program with Integrated Circuit Emphasis (SPICE) developed at the University of California, Berkeley (UC Berkeley), and various enhanced versions or derivatives of SPICE. SPICE and its derivatives or enhanced versions will be referred to hereafter as SPICE circuit simulators, or SPICE. The SPICE method considers a circuit as a non-divided object.

SPICE-like simulations may provide fairly accurate predictions of how corresponding circuits will behave when actually built. The predictions are preferably made not only for individual sub-circuit but also for whole systems (e.g., whole integrated circuits) so that system-wide problems relating to noise and the like may be uncovered and dealt with. In a general process flow of a SPICE-like simulation, an analog integrated circuit under simulation is often represented in the form of a netlist description. A netlist is a circuit description of the analog circuit to be simulated written in a SPICE-like language. SPICE netlists are pure structural languages with simulation control statements. Other language like Verilog-A™ has the capability to include behavioral constructs. The structural netlist of SPICE together with a predefined set of circuit components of the analog integrated circuit may be represented in the form of a matrix in accordance with certain circuit modeling methodologies. The number of non-linear differential equations ranges from 1 to n. There are a corresponding number of input vectors to be operated by the linear equation. The set of input vectors are shown as $\{I_1, I_2, \ldots I_n\}$. Next, the linear matrix is computed with the set of input vectors to generate a set of solution vectors $\{V_1, V_2, \ldots V_n\}$. The computation is repeated until the set of solutions converge. The set of solutions may be then displayed in the form of waveforms, measurements, or checks on a computer screen for engineers to inspect the simulation results.

However, SPICE-like simulation of a whole system becomes more difficult and problematic as the industry continues its relentless trek of scaling down to smaller and smaller device geometries and of cramming more interconnected components into the system. An example of such down scaling is the recent shift from micron-sized channels toward deep submicron sized transistor channel lengths. Because of the smaller device geometries, a circuit designer are able to cram exponentially larger numbers of circuit components (e.g., transistors, diodes, capacitors) into a given integrated circuit (IC), and therefore increases the matrix size to a complexity which may not be solved in a desired time frame.

A circuit may be represented as a large numerically discrete nonlinear matrix for analyzing instant current. The matrix dimension is of the same order as the number of the nodes in the circuit. For transient analysis, this giant nonlinear system needs to solve hundreds of thousand times, thus restricting the capacity and performance of the SPICE method. The SPICE method in general can simulate a circuit up to about 50,000 nodes. Therefore it is not practical to use the SPICE method in full chip design. It is widely used in cell design, library building, and accuracy verification.

With some accuracy lost, the Fast SPICE method developed in the early 1990s provides capacity and speed about two orders of magnitude greater than the SPICE method. The performance gain was made by employing simplified models, circuit partition methods, and event-driven algorithms, and by taking advantage of circuit latency.

SPICE models a circuit in a node/element fashion, i.e., the circuit is regarded as a collection of various circuit elements connected at nodes. At the heart of SPICE is the so-called Nodal Analysis, which is accomplished by formulating nodal equations (or circuit equations) in matrix format to represent the circuit and by solving these nodal equations. The circuit elements are modeled by device models, which produce model results that are represented in the circuit equations as matrices.

A device model for modeling a circuit element, such as the SPICE model for modeling MOSFET devices, developed by UC Berkeley, typically includes model equations and a set of model parameters that mathematically represent characteristics of the circuit element under various bias conditions. For example, a circuit element with n terminals can be modeled by the following current-voltage relations:

$$I_i = f_i(V_1, \ldots, V_n, t) \text{ for } i=1, \ldots, n,$$

where $I_i$ represents the current entering terminal I; $V_j$ (j=1, ..., n) represents the voltage or terminal bias across terminal j and a reference terminal, such as the ground; and t represents the time. The Kirchhoff's Current Law implies that the current entering terminal n is given by $$I_n = \sum_{i=1}^{n-1} I_i.$$

A conductance matrix of the circuit element is defined by:

$$G(V_1, \ldots, V_n, t) := \begin{pmatrix} \frac{\partial f_1}{\partial V_1} & \cdots & \frac{\partial f_1}{\partial V_n} \\ \vdots & \ddots & \vdots \\ \frac{\partial f_n}{\partial V_1} & \cdots & \frac{\partial f_n}{\partial V_n} \end{pmatrix}.$$

To model the circuit element under alternating current (AC) operations, the device model also considers the relationship between node charges and the terminal biases:

$$Q_i = q_i(V_1, \ldots, V_n, t) \text{ for } i = 1, \ldots, n.$$

where $Q_i$ represents the node charge at terminal i. Thus, the capacitance matrix of the n-terminal circuit element is defined by $$C(V_1, \ldots, V_n, t) := \begin{pmatrix} \frac{\partial q_1}{\partial V_1} & \cdots & \frac{\partial q_1}{\partial V_n} \\ \vdots & \ddots & \vdots \\ \frac{\partial q_n}{\partial V_1} & \cdots & \frac{\partial q_n}{\partial V_n} \end{pmatrix}.$$

Figure 1A:
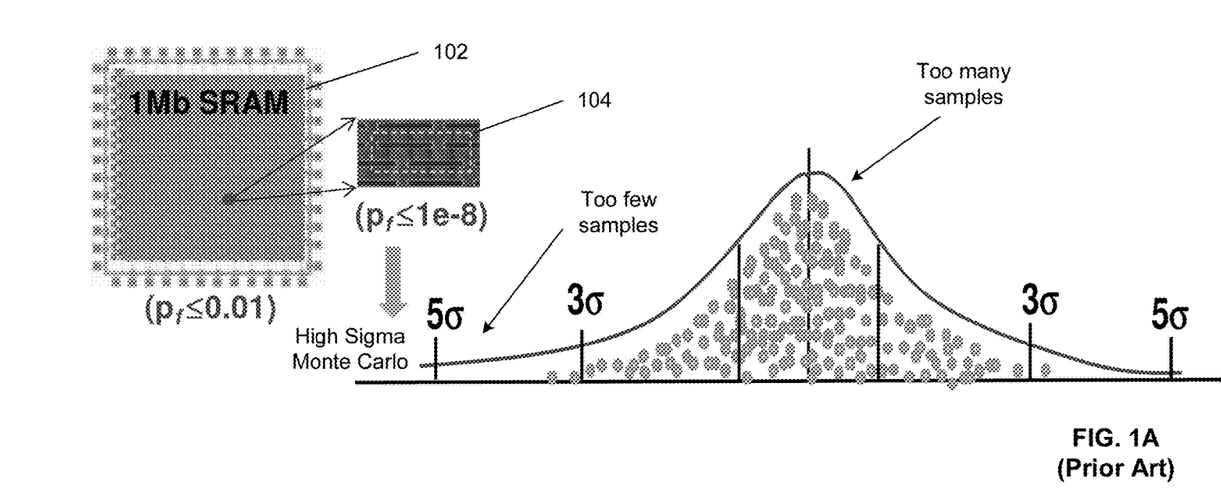
FIG. 1A illustrates a conventional method of determining a yield of a circuit in semiconductor manufacturing.

FIG. 1A illustrates a conventional method of determining a yield of a circuit in semiconductor manufacturing. As shown in FIG. 1A, Monte Carlo SPICE simulation is often used for circuit design with process corners. For circuits with high replication counts of cells, such as SRAM 102, the probability of failure ($P_f$) is required to be very low such that the overall probability of failure of an integrated circuit (also referred to as a chip) that includes the SRAM 102 can be low. For example, for a SRAM 102 having one million cells 104, the probability of failure needs to be in the order of 1e-8 to achieve a chip failure rate of less than one percent. To ensure high yields, i.e., low probability of failure, a large number of Monte Carlo samples, such as 1e-8 samples, may be simulated in order to predict a probability of failure of 1e-8. However, simulating such a large Monte Carlo samples consumes a long time and lots of resources. In addition, for high sigma Monte Carlo simulations, the conventional method tends to simulate too many samples in the low sigma region, and simulate too few samples in the high sigma region.

Therefore, there is a need for methods and systems that address the issues of the conventional method of yield prediction described above.

SUMMARY

Methods and systems are disclosed for determining a yield of a circuit in semiconductor manufacturing. In one embodiment, a computer implemented method of determining a yield of a circuit includes performing a first pass of Monte Carlo simulations of the circuit to identify a plurality of failed sampling points in a high sigma region of a statistical distribution, partitioning the plurality of failed sampling points into a plurality of clusters based on angular separation of the plurality of failed sampling points, determining a boundary of each cluster in the plurality of clusters, performing sensitivity analysis from the boundary of the each cluster to identify an estimated closest failed sampling point associated with the each cluster, and performing a second pass of Monte Carlo simulations of the circuit to determine the yield of the circuit using the estimated closest failed sampling point associated with the each cluster and the boundary of each cluster in the plurality of clusters.

In another embodiment, an apparatus for determining a yield of a circuit includes at least one processor, a memory communicatively coupled to the at least one processor, and a yield prediction engine configured to work with the at least one processor, wherein the yield prediction engine is configured to: perform a first pass of Monte Carlo simulations of the circuit to identify a plurality of failed sampling points in a high sigma region of a statistical distribution, partition the plurality of failed sampling points into a plurality of clusters based on angular separation of the plurality of failed sampling points, determine a boundary of each cluster in the plurality of clusters, perform sensitivity analysis from the boundary of the each cluster to identify an estimated closest failed sampling point associated with the each cluster, and perform a second pass of Monte Carlo simulations of the circuit to determine the yield of the circuit using the estimated closest failed sampling point associated with the each cluster and the boundary of each cluster in the plurality of clusters.

In yet another embodiment, a computer program product includes a non-transitory medium storing computer programs for execution by one or more computer systems. The computer program product further includes instructions for performing a first pass of Monte Carlo simulations of the circuit to identify a plurality of failed sampling points in a high sigma region of a statistical distribution, instructions for partitioning the plurality of failed sampling points into a plurality of clusters based on angular separation of the plurality of failed sampling points, instructions for determining a boundary of each cluster in the plurality of clusters, instructions for performing sensitivity analysis from the boundary of the each cluster to identify an estimated closest failed sampling point associated with the each cluster, and instructions for performing a second pass of Monte Carlo simulations of the circuit to determine the yield of the circuit using the estimated closest failed sampling point associated with the each cluster and the boundary of each cluster in the plurality of clusters.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DESCRIPTION OF EMBODIMENTS

Apparatuses and methods for determining a yield of a circuit in semiconductor manufacturing are provided. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1B:
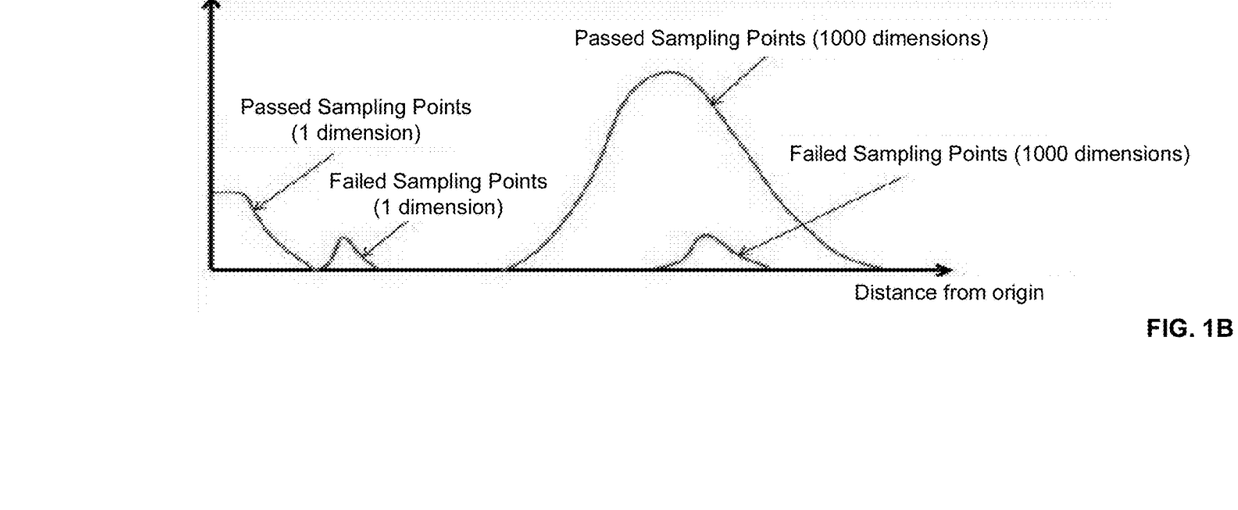
FIG. 1B illustrates challenges in determining a yield of a circuit with high dimensions of parameter variations.

FIG. 1B illustrates challenges in determining a yield of a circuit with high dimensions of parameter variations. As shown in FIG. 1B, in simulation of a circuit having a low dimension, such as variations of only one circuit parameter (1 dimension), the passed sampling points and the failed sampling points may be separated based on their distance from the a reference point, such as the origin. However, in simulation of a circuit having a high dimension, such as variations of a thousand circuit parameters (1000 dimensions), it is sufficiently more challenging to separate the passed sampling points from failed sampling points based on their distance from the reference point, such as the origin, as the passed sampling points and failed sampling points tend to overlap each other from the perspective of their distance from the origin. In other words, it would be hard to separate the passed sampling points and failed sampling points based on vector distance; ordering of samples would be ineffective; and conventional models would be ineffective for high dimensional simulations. According to aspects of the present disclosure, the methods described herein address the challenges of determining a yield of a circuit with high dimensions of parameter variations.

Figure 2:
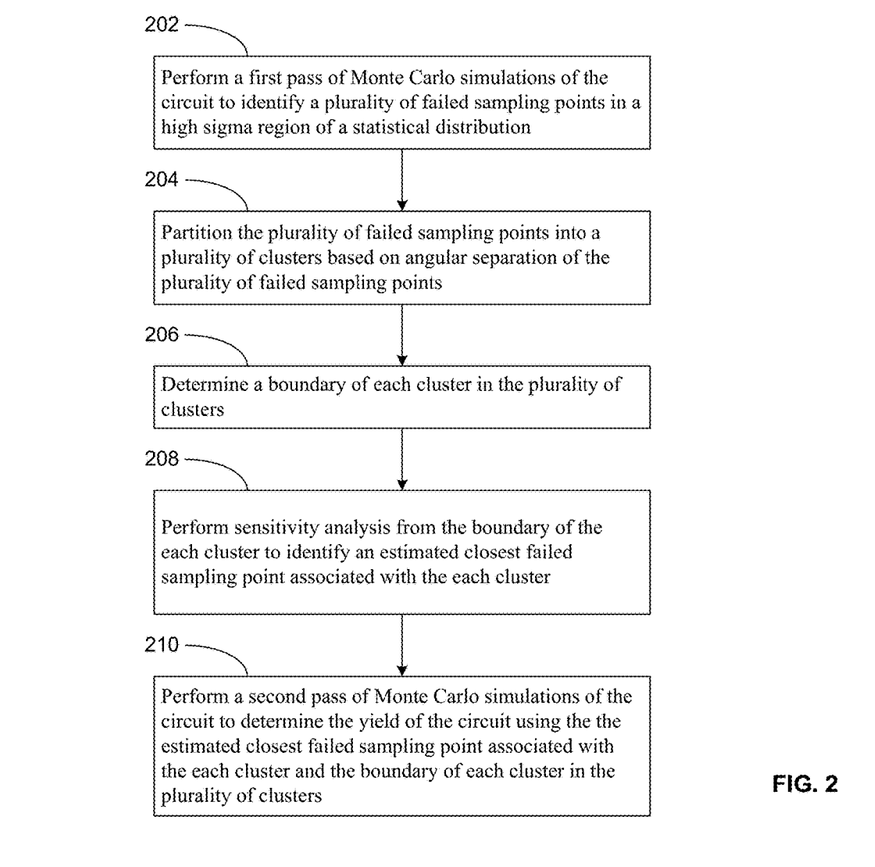
FIG. 2 illustrates a method of determining a yield of a circuit according to some aspects of the present disclosure.

FIG. 2 illustrates a method of determining a yield of a circuit according to some aspects of the present disclosure. In one exemplary implementation as shown in FIG. 2, in block 202, the method performs a first pass of Monte Carlo simulations of the circuit to identify a plurality of failed sampling points in a high sigma region of a statistical distribution. In block 204, the method partitions the plurality of failed sampling points into a plurality of clusters based on angular separation of the plurality of failed sampling points. In block 206, the method determines a boundary of each cluster in the plurality of clusters. In block 208, the method performs sensitivity analysis from the boundary of the each cluster to identify an estimated closest failed sampling point associated with the each cluster. In block 210, the method performs a second pass of Monte Carlo simulations of the circuit to determine the yield of the circuit using the estimated closest failed sampling point associated with the each cluster and the boundary of each cluster in the plurality of clusters.

Figure 3A:
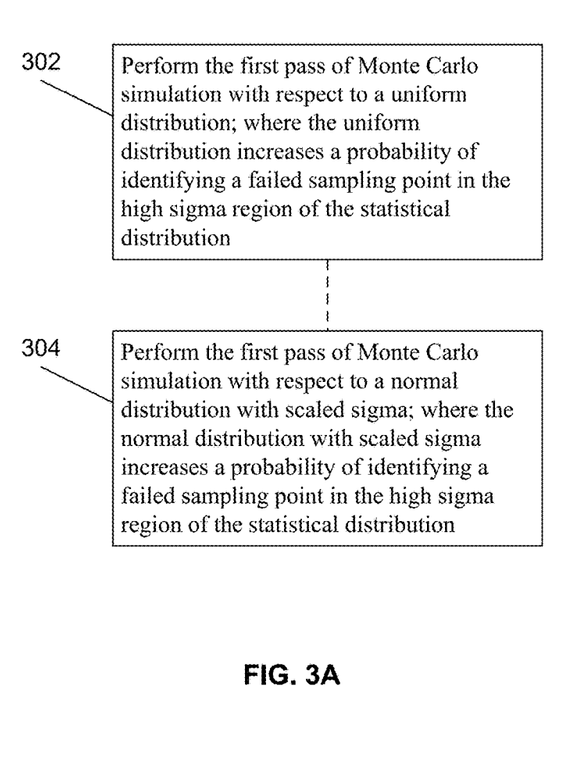
FIG. 3A illustrates another method of performing first pass of Monte Carlo simulations of the circuit.

FIG. 3A illustrates another method of performing first pass of Monte Carlo simulations of the circuit according to aspects of the present disclosure. In the example shown in FIG. 3A, in block 302, the method performs the first pass of Monte Carlo simulation with respect to a uniform sampling 306 with $g(x)=U(x)$, where the first pass of Monte Carlo simulation increases a probability of identifying a failed sampling point in the high sigma region of the statistical distribution 308.

Optionally, in block 304, the method performs the first pass of Monte Carlo simulation with respect to a normal distribution with scaled sigma and/or shifted mean 310 with $g(x)=f(x-\mu_s)$, where the first pass of Monte Carlo simulation increases a probability of identifying a failed sampling point in the high sigma region of the statistical distribution 308. Note that according to aspects of the present disclosure, either the method described in block 302 (shown in dotted line) or the method described in block 304 (shown in dotted line) may be performed.

Figure 3B:
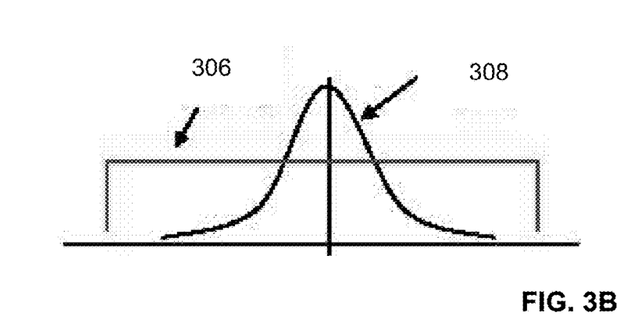
FIG. 3B illustrates a method of performing Monte Carlo simulation with uniform distribution.

FIG. 3B is a graphical illustration of performing Monte Carlo simulation with uniform distribution according to aspects of the present disclosure. In this exemplary approach, a uniform distribution sampling 306 with $g(x)=U(x)$, is performed on a statistical distribution 308. The failed sampling point in the high sigma region of the statistical distribution 308 represents a set of circuit parameters that may produce a corresponding set of incorrect outputs of the circuit.

Figure 3C:
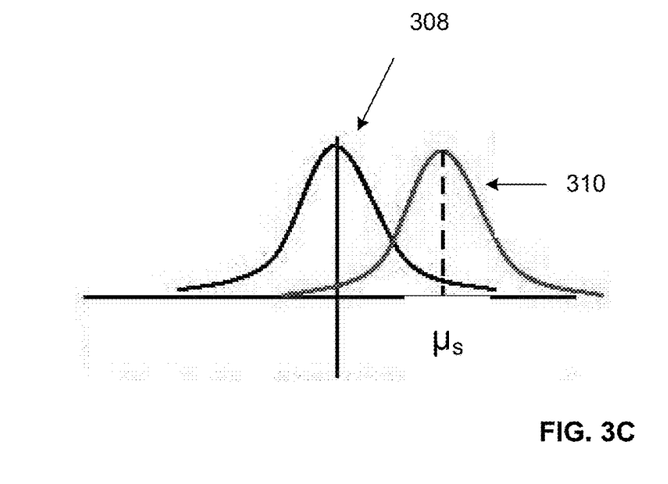
FIG. 3C illustrates a method of performing Monte Carlo simulation with mean and sigma shifts according to aspects of the present disclosure.

FIG. 3C illustrates a method of performing Monte Carlo simulation with mean and sigma shifts according to aspects of the present disclosure. In this exemplary approach, a normal distribution with scaled sigma and/or shifted mean ($\mu_s$) 310 with $g(x)=f(x-\mu_s)$, is performed on the statistical distribution 308. The failed sampling point in the high sigma region of the statistical distribution 308 represents a set of circuit parameters that may produce a corresponding set of incorrect outputs of the circuit.

In yet another approach, a mixture of distributions may be adjusted so that the right area can be attended to without leaving any cold spots. For example, $g(x)=\lambda_1 * f(x)+\lambda_2 * U(x)+(1-\lambda_1-\lambda_2)*f(x-\mu s)$.

Figure 4A:
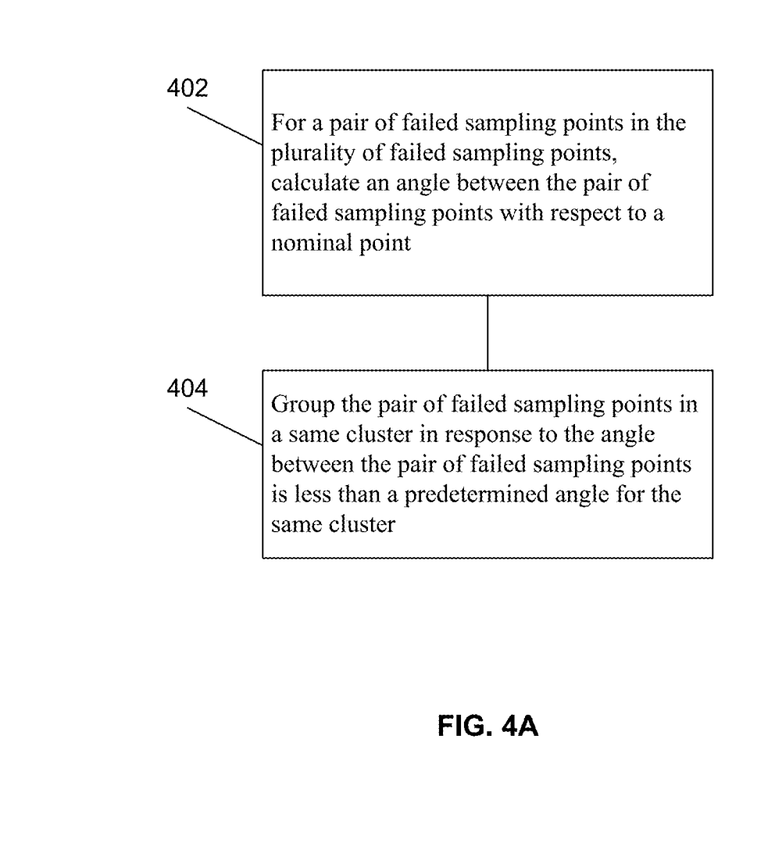
FIG. 4A illustrates a method of partitioning a plurality of failed sampling points into multiple clusters.

FIG. 4A illustrates a method of partitioning a plurality of failed sampling points into multiple clusters according to some aspects of the present disclosure. As shown in FIG.

4A, for a pair of failed sampling points in the plurality of failed sampling points, in block 402, the method calculates an angle between the pair of failed sampling points with respect to a nominal point. In block 404, the method groups the pair of failed sampling points in a same cluster in response to the angle between the pair of failed sampling points is less than a predetermined angle for the same cluster.

Figure 4B:
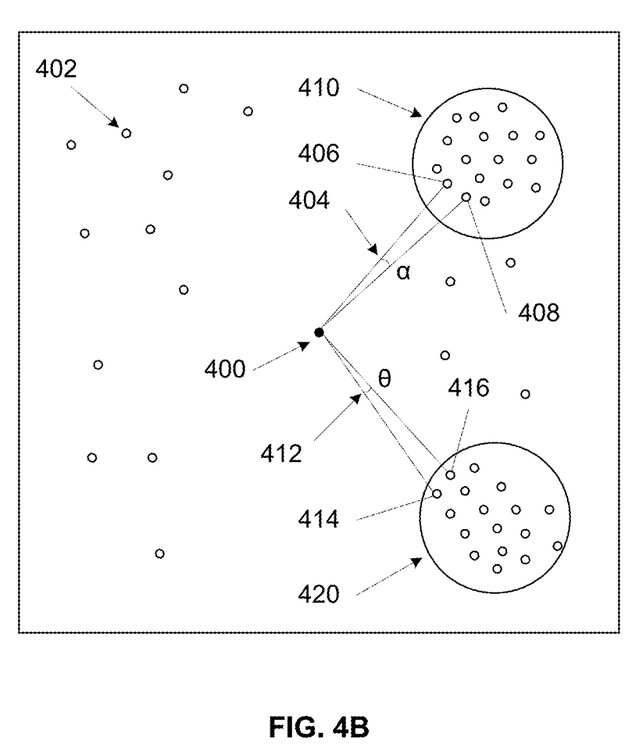
FIG. 4B is a graphical illustration of partitioning a plurality of failed sampling points into multiple clusters.

FIG. 4B is a graphical illustration of partitioning a plurality of failed sampling points into multiple clusters according to some aspects of the present disclosure. As shown in FIG. 4B, a circle, such as circle 402 represents a failed sampling point. According to aspects of the present disclosure, multiple failed sampling points may be grouped into one or more clusters. In one approach, an angle, such as angle α 404, between a pair of failed sampling points 406 and 408 with respect to a nominal point, such as point 400, is calculated. If the angle α 404 between the pair of failed sampling points 406 and 408 is less than a predetermined threshold angle for cluster 410 (represented by the circle 410), then the pair of failed sampling points 406 and 408 is grouped in the cluster 410. The method is repeated until the remaining failed sampling points in the cluster 410 are identified.

Similarly, for cluster 420, an angle, such as angle θ 412, between a pair of failed sampling points 414 and 416 with respect to a nominal point, such as point 400, is calculated. If the angle θ 412 between the pair of failed sampling points 414 and 416 is less than a predetermined threshold angle for cluster 420 (represented by the circle 420), then the pair of failed sampling points 414 and 416 is grouped in the cluster 420. The method is repeated until the remaining failed sampling points in the cluster 420 are identified. In some implementations, the predetermined threshold angle for each cluster may have different values. For example, the predetermined threshold angle for cluster 410 may be different than the predetermined threshold angle for cluster 420.

Figure 4C:
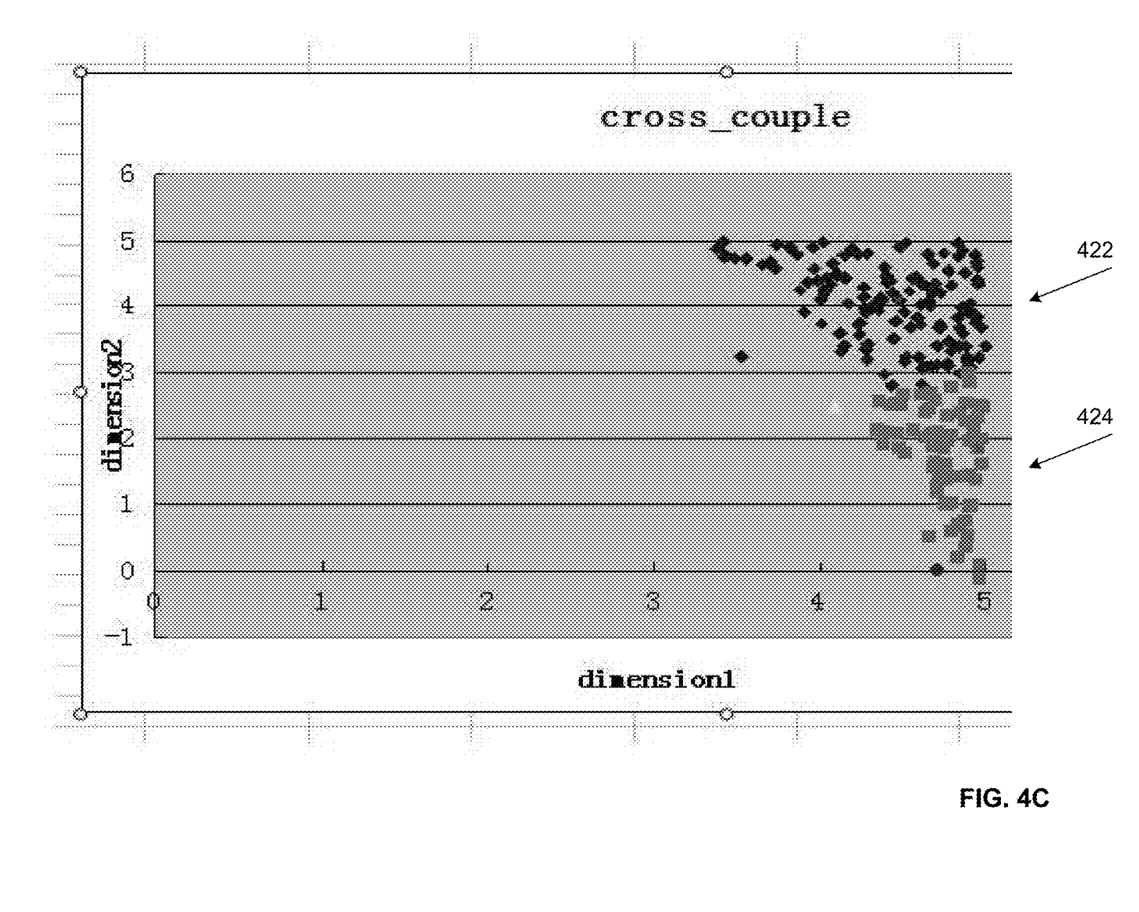
FIG. 4C is another graphical illustration of partitioning a plurality of failed sampling points into multiple clusters according to some aspects of the present disclosure.

FIG. 4C is another graphical illustration of partitioning a plurality of failed sampling points into multiple clusters according to some aspects of the present disclosure. In the example shown in FIG. 4C, a circuit with two dimensions is shown for illustration purposes, with the horizontal axis represent the variations of dimension 1 and the vertical axis represents the variations of dimension 2. In this example, there are two clusters, the black dots belong to cluster 522, and the grey dots belong to cluster 524. In this case, the nominal point is the origin, (0, 0). The method of partitioning the plurality of failed sampling points into clusters 522 and 524 is similar to the method described above in association with FIG. 4B.

Figure 5A:
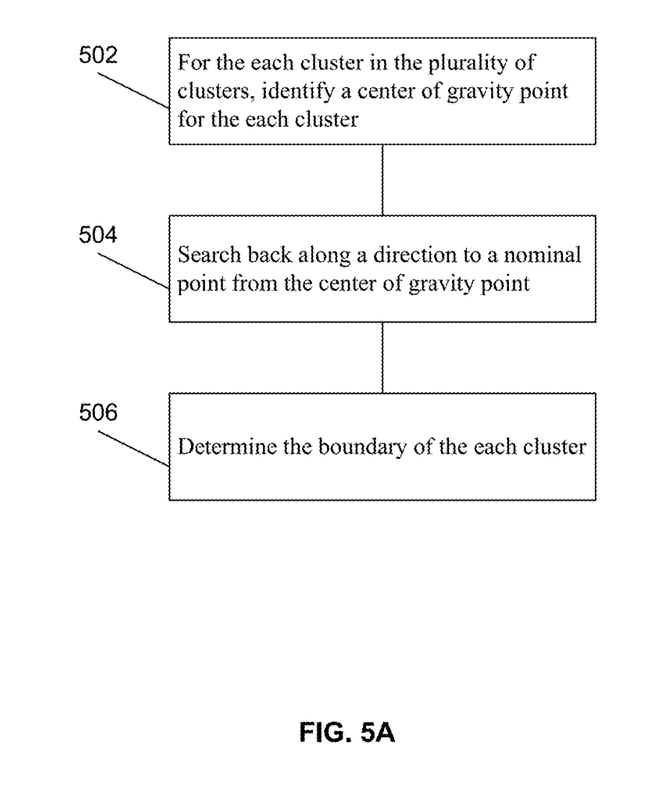
FIG. 5A illustrates a method of determining a boundary for a cluster of failed sampling points.

FIG. 5A illustrates a method of determining a boundary for a cluster of failed sampling points according to some aspects of the present disclosure. In the example shown in FIG. 5A, for the each cluster in the plurality of clusters, in block 502, the method identifies a center of gravity point for the each cluster. In block 504, the method searches back along a direction to a nominal point from the center of gravity point. In block 506, the method determines the boundary of the each cluster.

According to aspects of the present disclosure, the boundary of each cluster is an approximation of separation of failed sampling points and passing sampling points of the each cluster with respect to one or more circuit parameters. The boundary of each cluster in the plurality of clusters represents a shifted mean being used in the second pass of Monte Carlo simulations of the circuit.

Figure 5B:
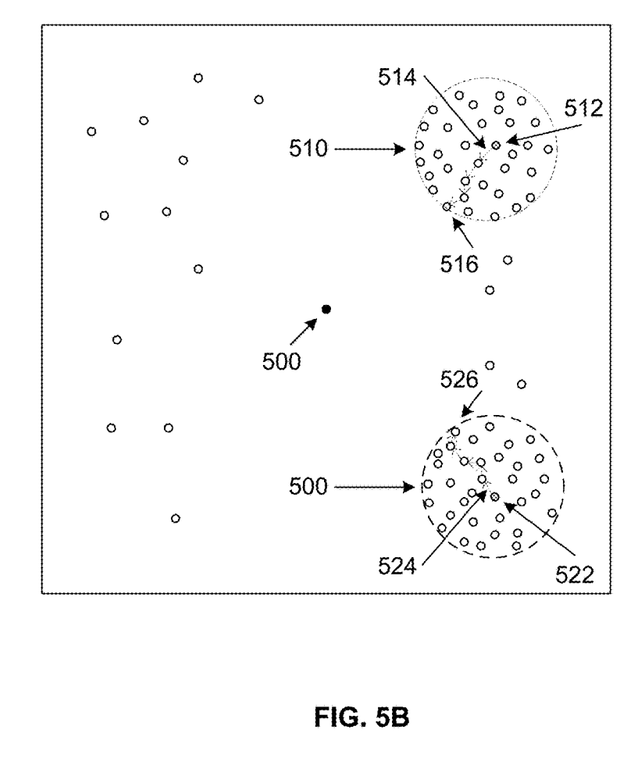
FIG. 5B is another graphical illustration of determining a boundary for a cluster of failed sampling points according to some aspects of the present disclosure.

FIG. 5B is a graphical illustration of determining a boundary for a cluster of failed sampling points according to some aspects of the present disclosure. As shown in FIG. 5B, for the each cluster, such as cluster 510 (shown as a group of failed sampling points within the dotted circle), the method identifies a center of gravity point 512 for the cluster 510. Then, the method searches back along a direction (identified by arrow 514) towards a nominal point 500 from the center of gravity point 512. The process is repeated, represented by the series of arrows from the center of gravity point 512 to the failed sampling point 516, until a boundary of cluster 510 is determined.

Similarly for cluster 520, shown as a group of failed sampling points within the dotted circle, the method identifies a center of gravity point 522 for the cluster 520. Then, the method searches back along a direction (identified by arrow 524) towards the nominal point 500 from the center of gravity point 522. The process is repeated, represented by the series of arrows from the center of gravity point 522 to the failed sampling point 526, until a boundary of cluster 520 is determined.

Figure 6A:
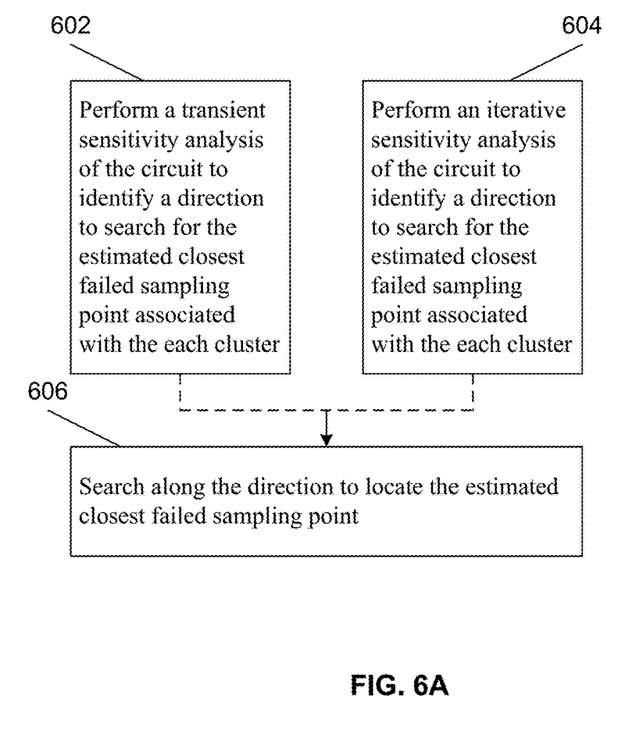
FIG. 6A illustrates a method of performing sensitivity analysis from the boundary of the each cluster.

FIG. 6A illustrates a method of performing sensitivity analysis from the boundary of the each cluster according to some aspects of the present disclosure. In the example shown in FIG. 6A, in block 602, the method performs a transient sensitivity analysis of the circuit to identify a direction to search for the estimated closest failed sampling point associated with the each cluster. In block 604, the method performs an iterative sensitivity analysis of the circuit to identify a direction to search for the estimated closest failed sampling point associated with the each cluster. In block 606, the method searches along the direction to locate the estimated closest failed sampling point, where the estimated closest failed sampling point of the each cluster is caused by one or more sensitive circuit parameters impacting the yield of the circuit.

According to aspects of the present disclosure, the methods described in block 602 and block 604 may be performed individually independent of each other or a combination of the methods described in block 602 and block 604 may be performed. In other words, in one approach, only the methods described in block 602 may be performed. In another approach, only the methods described in block 604 may be performed. In yet another approach, both the methods described in block 602 and block 604 may be performed in the sensitivity analysis of the circuit.

Figure 6B:
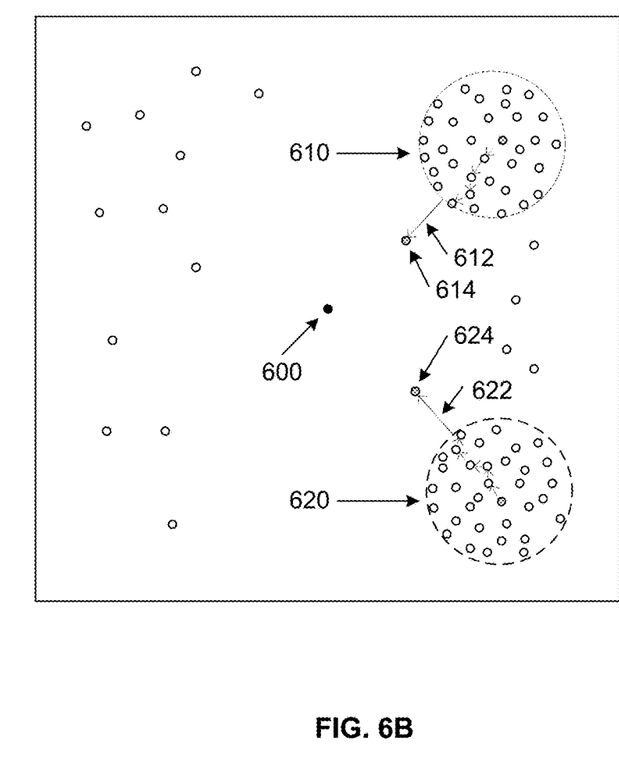
FIG. 6B is a graphical illustration of performing sensitivity analysis from the boundary of the each cluster according to some aspects of the present disclosure.

FIG. 6B is a graphical illustration of performing sensitivity analysis from the boundary of the each cluster according to some aspects of the present disclosure. As shown in FIG. 6B, from the boundary of a cluster, such as cluster 610, the method performs a transient sensitivity analysis of the circuit to identify a direction to search for the estimated closest failed sampling point 614 associated with cluster 610. Then, the method searches along the direction (represented by arrow 612) to locate the estimated closest failed sampling point 614. Note that the estimated closest failed sampling point of the each cluster may be caused by one or more sensitive circuit parameters impacting the yield of the circuit. Similarly, from the boundary of cluster 620, the method performs an iterative sensitivity analysis of the circuit to identify a direction to search for the estimated closest failed sampling point 614 associated with cluster 620. Then, the method searches along the direction (represented by arrow 622) to locate the estimated closest failed sampling point 624.

Figure 7A:
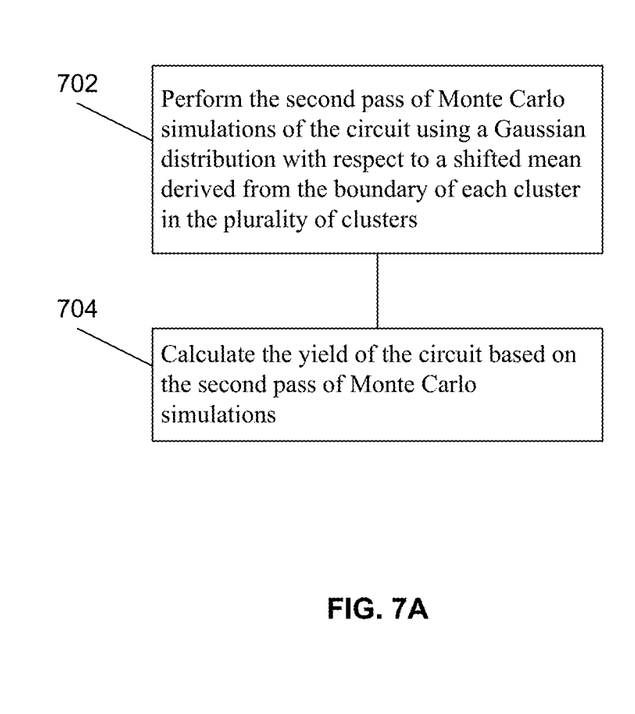
FIG. 7A illustrates a method of performing second pass Monte Carlo simulations of the circuit.

FIG. 7A illustrates a method of performing second pass Monte Carlo simulations of the circuit according to aspects of the present disclosure. As shown in the example of FIG. 7, in block 702, the method performs second pass of Monte Carlo simulations of the circuit using a Gaussian distribution with respect to a shifted mean derived from the boundary of each cluster in the plurality of clusters. In block 704, the method calculates the yield of the circuit based on the second pass of Monte Carlo simulations.

Figure 7B:
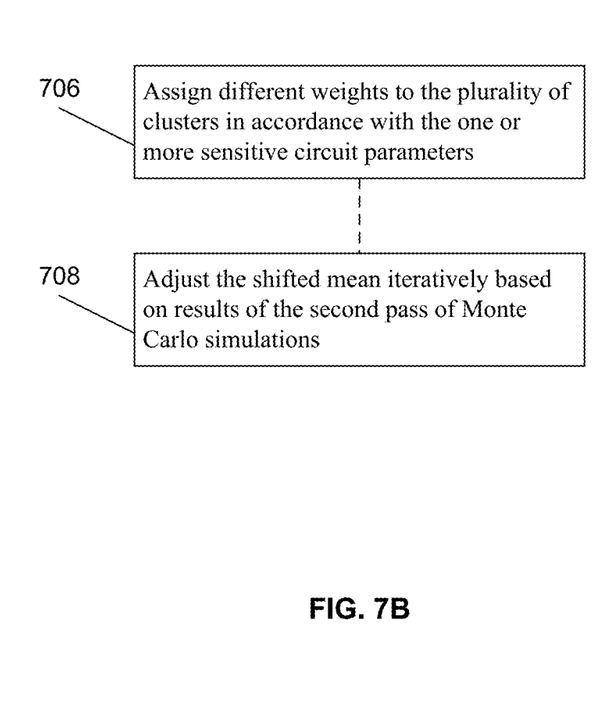
FIG. 7B illustrates variations of the method of performing second pass Monte Carlo simulations of the circuit in FIG. 7A according to aspects of the present disclosure.

FIG. 7B illustrates variations of the method of performing second pass Monte Carlo simulations of the circuit in FIG. 7A according to aspects of the present disclosure. In block 706, the method may assign different weights to the plurality of clusters in accordance with the one or more sensitive circuit parameters. In block 708, the method may adjust the shifted mean iteratively based on results of the second pass of Monte Carlo simulations.

According to aspects of the present disclosure, in some implementations, the methods described in block 706 and block 708 maybe optional (shown in dotted line) may be performed independent of each other. In some other implementations, the methods described in block 706 and block 708 may be performed together in a combined manner.

Figure 8:
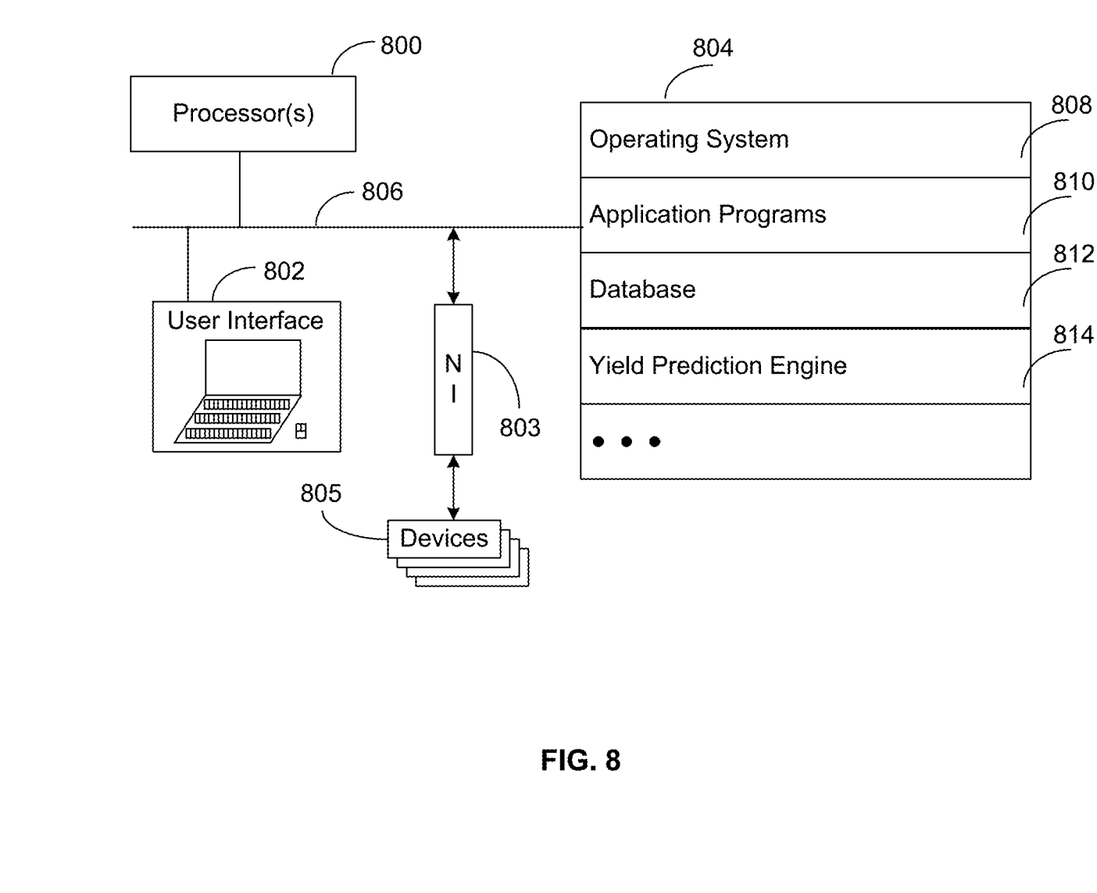
FIG. 8 illustrates a system for determining a yield of a circuit according to some aspects of the present disclosure.

FIG. 8 illustrates a system for determining a yield of a circuit according to some aspects of the present disclosure. In one embodiment, the methodologies for determining a yield of a circuit may be implemented using a computer system. The computer system may include one or more processors, such as graphics processing units (GPUs) and/or central processing units (CPUs) 800, at least a user interface 802 for displaying computation results and waveforms, a memory device 804, a system bus 806, and one or more bus interfaces for connecting the processors, user interface, memory device, and system bus together. The computer system also includes at least one network interface 803 for communicating with other devices 805 on a computer network. In alternative embodiments, certain functionalities of the method and system may be implemented in one or more application-specific integrated circuits (ASICs) or field-programmable gate arrays (FPGAs) for performing the functions of the yield prediction engine described herein, thereby reducing the role of the processors.

The memory device 804 may include high-speed random-access memory and may also include non-volatile memory, such as one or more magnetic disk storage devices. The memory device may also include mass storage that is located remotely from the processors. The memory device preferably stores:
  an operating system 808 that includes procedures for handling various basic system services and for performing hardware-dependent tasks;
  application programs 810 for performing other user-defined applications and tasks, such as circuit simulations and device evaluations;
  database 812 for storing sampling points and simulation parameters;
  a yield prediction engine 814 for determining a yield of a circuit in semiconductor manufacturing.

The database 812, the application programs, and the program for determining a yield of a circuit may include executable procedures, sub-modules, tables, and other data structures. In other embodiments, additional or different modules and data structures may be used, and some of the modules and/or data structures listed above may not be used.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

We claim:

1. A computer implemented method of determining a yield of a circuit in semiconductor manufacturing, performed by a yield prediction engine or at least a processor, comprising:
  performing a first pass of Monte Carlo simulations of the circuit with a scaled sigma to identify a plurality of failed sampling points in a high sigma region of a statistical distribution, wherein simulating the circuit with the scaled sigma increases a probability of identifying the plurality of failed sampling points in the high sigma region of the statistical distribution;
  partitioning the plurality of failed sampling points into a plurality of clusters based on angular separation of the plurality of failed sampling points;
  determining a boundary of each cluster in the plurality of clusters, comprising for the each cluster in the plurality of clusters, identifying a center of gravity point for the each cluster, searching back along a direction to a nominal point from the center of gravity point, and determining the boundary of the each cluster, wherein the boundary of each cluster is an approximation of separation of failed sampling points and passing sampling points of the each cluster with respect to one or more circuit parameters;
  performing sensitivity analysis from the boundary of the each cluster to identify an estimated closest failed sampling point associated with the each cluster; and
  performing a second pass of Monte Carlo simulations of the circuit to determine the yield of the circuit using the estimated closest failed sampling point associated with the each cluster and the boundary of each cluster in the plurality of clusters, wherein the yield determined is used to ensure low probability of failure in semiconductor manufacturing of the circuit.

2. The computer implemented method of claim 1, wherein performing a first pass of Monte Carlo simulations of the circuit comprises:
performing the first pass of Monte Carlo simulation with respect to a uniform distribution or a normal distribution with the scaled sigma.

3. The computer implemented method of claim 2, wherein the failed sampling point in the high sigma region of the statistical distribution represents a set of circuit parameters that produce a corresponding set of incorrect outputs of the circuit.

4. The computer implemented method of claim 1, wherein partitioning the plurality of failed sampling points into a plurality of clusters comprises:
for a pair of failed sampling points in the plurality of failed sampling points,
calculating an angle between the pair of failed sampling points with respect to a nominal point; and
grouping the pair of failed sampling points in a same cluster in response to the angle between the pair of failed sampling points is less than a predetermined angle for the same cluster.

5. The computer implemented method of claim 1, wherein performing sensitivity analysis from the boundary of the each cluster comprises at least one of:
performing a transient sensitivity analysis of the circuit to identify a direction to search for the estimated closest failed sampling point associated with the each cluster;
performing an iterative sensitive analysis of the circuit to identify the direction to search for the estimated closest failed sampling point associated with the each cluster;
or some combination thereof.

6. The computer implemented method of claim 5, further comprising:
searching along the direction to locate the estimated closest failed sampling point, wherein the estimated closest failed sampling point of the each cluster is caused by one or more sensitive circuit parameters impacting the yield of the circuit.

7. The computer implemented method of claim 5, wherein the boundary of each cluster in the plurality of clusters represents a shifted mean being used in the second pass of Monte Carlo simulations of the circuit.

8. The computer implemented method of claim 1, wherein performing the second pass of Monte Carlo simulations of the circuit comprises:
performing the second pass of Monte Carlo simulations of the circuit using a Gaussian distribution with respect to a shifted mean derived from the boundary of each cluster in the plurality of clusters; and
calculating the yield of the circuit based on the second pass of Monte Carlo simulations.

9. The computer implemented method of claim 8, further comprising:
assigning different weights to the plurality of clusters in accordance with the one or more sensitive circuit parameters.

10. The computer implemented method of claim 8, further comprising:
adjusting the shifted mean iteratively based on results of the second pass of Monte Carlo simulations.

11. An apparatus, comprising:
at least one processor;
a memory communicatively coupled to the at least one processor; and
a yield prediction engine configured to work with the at least one processor, wherein the yield prediction engine is configured to:
perform a first pass of Monte Carlo simulations of the circuit with a scaled sigma to identify a plurality of failed sampling points in a high sigma region of a statistical distribution, wherein simulating the circuit with the scaled sigma increases a probability of identifying the plurality of failed sampling points in the high sigma region of the statistical distribution;
partition the plurality of failed sampling points into a plurality of clusters based on angular separation of the plurality of failed sampling points;
determine a boundary of each cluster in the plurality of clusters, comprising for the each cluster in the plurality of clusters, identify a center of gravity point for the each cluster, search back along a direction to a nominal point from the center of gravity point, and determine the boundary of the each cluster, wherein the boundary of each cluster is an approximation of separation of failed sampling points and passing sampling points of the each cluster with respect to one or more circuit parameters;
perform sensitivity analysis from the boundary of the each cluster to identify an estimated closest failed sampling point associated with the each cluster; and
perform a second pass of Monte Carlo simulations of the circuit to determine the yield of the circuit using the estimated closest failed sampling point associated with the each cluster and the boundary of each cluster in the plurality of clusters, wherein the yield determined is used to ensure low probability of failure in semiconductor manufacturing of the circuit.

12. The apparatus of claim 11, wherein the yield prediction engine is configured to perform a first pass of Monte Carlo simulations of the circuit comprises:
perform the first pass of Monte Carlo simulation with respect to a uniform distribution or a normal distribution with the scaled sigma.

13. The apparatus of claim 12, wherein the failed sampling point in the high sigma region of the statistical distribution represents a set of circuit parameters that produce a corresponding set of incorrect outputs of the circuit.

14. The apparatus of claim 11, wherein the yield prediction engine is configured to partition the plurality of failed sampling points into a plurality of clusters comprises:
for a pair of failed sampling points in the plurality of failed sampling points,
calculate an angle between the pair of failed sampling points with respect to a nominal point; and
group the pair of failed sampling points in a same cluster in response to the angle between the pair of failed sampling points is less than a predetermined angle for the same cluster.

15. The apparatus of claim 11, wherein the yield prediction engine is configured to perform sensitivity analysis from the boundary of the each cluster comprises at least one of:
perform a transient sensitivity analysis of the circuit to identify a direction to search for the estimated closest failed sampling point associated with the each cluster;
perform an iterative sensitive analysis of the circuit to identify the direction to search for the estimated closest failed sampling point associated with the each cluster;
or some combination thereof.

16. The apparatus of claim 15, the yield prediction engine is further configured to:

search along the direction to locate the estimated closest failed sampling point, wherein the estimated closest failed sampling point of the each cluster is caused by one or more sensitive circuit parameters impacting the yield of the circuit.

17. The apparatus of claim 15, wherein the boundary of each cluster in the plurality of clusters represents a shifted mean being used in the second pass of Monte Carlo simulations of the circuit.

18. The apparatus of claim 11, wherein the yield prediction engine is configured to perform the second pass of Monte Carlo simulations of the circuit comprises:
   perform the second pass of Monte Carlo simulations of the circuit using a Gaussian distribution with respect to a shifted mean derived from the boundary of each cluster in the plurality of clusters; and
   calculate the yield of the circuit based on the second pass of Monte Carlo simulations.

19. The apparatus of claim 18, the yield prediction engine is further configured to:
   assign different weights to the plurality of clusters in accordance with the one or more sensitive circuit parameters.

20. The apparatus of claim 18, the yield prediction engine is further configured to:
   adjust the shifted mean iteratively based on results of the second pass of Monte Carlo simulations.

21. A computer program product comprising a non-transitory medium storing computer programs for execution by one or more processors, the computer program product comprising:
   instructions for performing a first pass of Monte Carlo simulations of the circuit with a scaled sigma to identify a plurality of failed sampling points in a high sigma region of a statistical distribution, wherein simulating the circuit with the scaled sigma increases a probability of identifying the plurality of failed sampling points in the high sigma region of the statistical distribution;
   instructions for partitioning the plurality of failed sampling points into a plurality of clusters based on angular separation of the plurality of failed sampling points;
   instructions for determining a boundary of each cluster in the plurality of clusters;
   instructions for performing sensitivity analysis from the boundary of the each cluster to identify an estimated closest failed sampling point associated with the each cluster; and
   instructions for performing a second pass of Monte Carlo simulations of the circuit to determine the yield of the circuit using the estimated closest failed sampling point associated with the each cluster and the boundary of each cluster in the plurality of clusters, wherein the yield determined is used to ensure low probability of failure in semiconductor manufacturing of the circuit.

* * * * *